J. H. & C. D. HUDDLE.
REEL FOR HARVESTERS.
APPLICATION FILED MAR. 25, 1909.
952,249.
Patented Mar. 15, 1910.
2 SHEETS—SHEET 1.
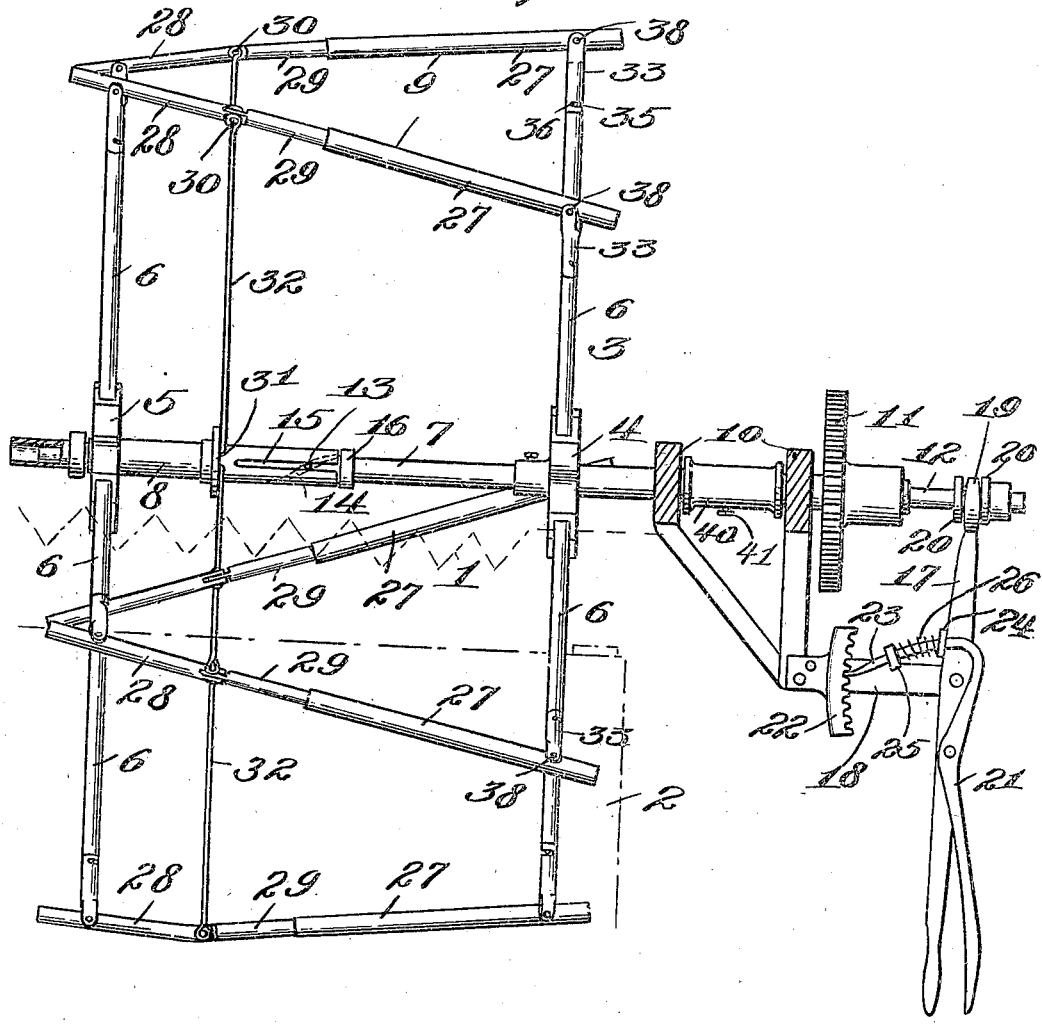
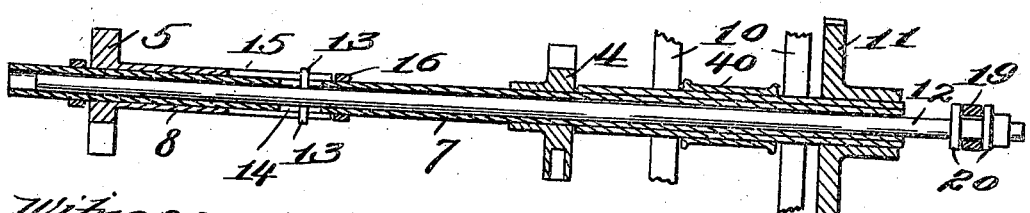

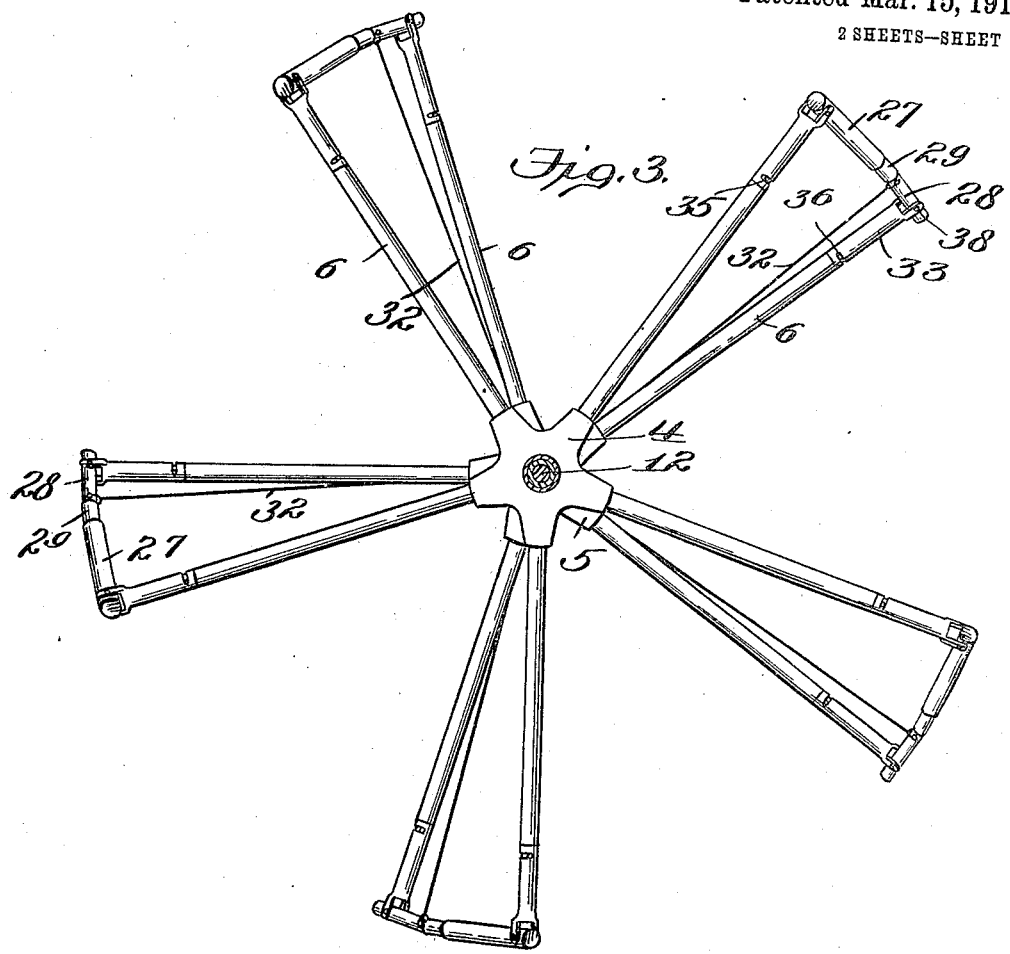

UNITED STATES PATENT OFFICE.

JOHN HERBERT HUDDLE AND CALHOUN DALLAS HUDDLE, OF EAST RADFORD, VIRGINIA, ASSIGNORS OF ONE-THIRD TO EDWIN T. PRATT, OF DRAPER, VIRGINIA.

REEL FOR HARVESTERS.

952,249.  Specification of Letters Patent. Patented Mar. 15, 1910.

Application filed March 25, 1909. Serial No. 485,702.

*To all whom it may concern:*

Be it known that we, JOHN HERBERT HUDDLE and CALHOUN DALLAS HUDDLE, citizens of the United States, residing at East Radford, in the county of Montgomery and State of Virginia, have invented new and useful Improvements in Reels for Harvesters, of which the following is a specification.

This invention relates to new and useful improvements in reels for harvesters and more particularly to a reel of the general type in which angularly adjustable rounds or beaters are provided.

The primary object of the invention is to provide a reel having its rounds or beaters of novel construction in order that irrespective of the angle at which they are set they will be at the same distance from the cutter bar at their centers as at their ends.

The invention aims as a further object to provide a novel construction in which the rounds may be adjusted without any endwise or axial movements of the spider frames by which the blades are supported. The reel as an entirety is thus strengthened, rendered simpler in construction and operation and more durable.

In the accompanying drawings a preferred and advantageous embodiment of the invention is illustrated, the structural details of which are set forth in the following description, while the novel features by which the invention is distinguished from the prior art will be recited in the claims appended at the end of the description.

In the said drawings: Figure 1 is a top plan view of the reel, the beater rounds being disposed angularly. Fig. 2 is a fragmentary longitudinal sectional view illustrating the rotatable central shaft and its adjuncts. Fig. 3 is an end elevation of the reel, the beater rounds being disposed angularly. Fig. 4 is a detail sectional view, partly in elevation, illustrating the structural details of the beater rounds. Fig. 5 is a detail perspective view illustrating coöperating elements of the beater round adjusting means.

Similar characters of reference refer to corresponding parts throughout the several views.

Referring more particularly to Fig. 1, the numeral 1 indicates the cutter bar and the numeral 2 the canvas conveyer belt above which is positioned the reel which forms the subject matter of the present invention and which is designated generally by the numeral 3.

The reel in its general organization comprises spider frames which are provided at each end thereof. Each spider frame consists of a hub section, designated as 4 and 5 respectively, and spokes, as 6, which project radially from the hubs, the latter having suitable sockets to receive the inner end portions of said spokes. The hub 4 which is located at the inner end of the reel is mounted fast upon a hollow shaft, as 7, and the hub 5 which is located at the outer end of the reel is mounted fast upon a hollow shaft, as 8, which surrounds the shaft 7 and which, in operation, is rotatable therewith but, in effecting an adjustment of the beater rounds, may be rotated relatively to the shaft 7 in a manner to be later described. The corresponding spokes 6 are connected in pairs by beater rounds, as 9, the structural details of which will be set forth hereinafter.

The shaft 7 is supported near its inner end in suitable bearings 10 and has a portion thereof projecting beyond said bearings and provided with a spur wheel, as 11, which forms an element of a suitable gear train (not shown) for rotating the reel. Within the shaft 7 is a slidable shaft, as 12. The shaft 12 is provided at a suitable point with oppositely arranged pins, as 13, which project through correspondingly inclined slots 14 in the shaft 7 and through straight longitudinal slots 15 in the shaft 8. The latter is held against axial movement by a stop collar, as 16, provided on the shaft 7. By virtue of the pins 13 the shafts 12, 7 and 8, are coupled together for rotation. When the shaft 12 is moved axially, however, by virtue of the engagement of the pins 13 in the slots 14 and 15, the shaft 8 is partially rotated relatively to the shaft 7, the outer spider frame being moved therewith, in order to effect an angular adjustment of the rounds 9. For the purpose of moving the shaft 12 axially to effect any desired adjustment of the angular positions of the rounds 9, a lever, as 17, is provided. This lever is pivoted intermediate its ends to a suitable bracket 18 which is in turn connected to the bearings 10 and has at its inner end a yoke, as 19, which engages the shaft 12 between two spaced flanges 20 thereof.

It will be apparent that pivotal movement of the lever 17 will produce slidable movement of the shaft 12. For the purpose of locking the lever 17 at any desired position, means comprising a lever 21 in the nature of a pawl, and a rack 22 is provided. The lever 21 is pivoted upon the lever 17 and has an angularly extended end portion, as 23, which terminates in a tooth for engagement between the teeth of the rack 22. The end portion 23 is slightly curved and projects through a lug 24 of the lever 17, between which and a nut 25 on the end portion 23, an expansive coil spring 26 is interposed, the purpose of which is to maintain the engagement of the toothed end portion 23 with the rack 22.

In the present embodiment of the invention each beater round 9 comprises three sections as follows; a hollow end section 27, an end section 28 and an intermediate section 29. The section 29 telescopes in the section 27 and is pivoted, as at 30, to the section 28. During the angular adjustments of the rounds 9, the pivot 30 moves relatively to the end portions of the rounds in order that it may always be at a constant distance from the center of the reel, which distance is equal to the distance between the center of the reel and the rounds at their ends. While the pivots 30 are ordinarily self-adjusting, it is nevertheless preferred to employ a positive means for maintaining the constancy of their relation to the center of the reel in order that any loose play or defect which might tend to vary such relation may be compensated for and accordingly we employ a ring, as 31, which is mounted upon the shaft 8 and to which are pivoted links, as 32, the latter being also pivoted to the connections 30.

Means for connecting the rounds to the spokes 6 is illustrated more particularly in Fig. 4 and comprises a member, as 33, which is formed as a socket and fits over the reduced end portion 34 of the spoke. In such relation the member 33 has a partial rotation which is limited by a pin, as 35, provided on the end portion 34 and projecting through a slot 36 formed transversely in the member 33. The said member is also provided with axially projecting ears 37 between which the end portions of the sections 27 or 29 as the case may be, fit and are held by pivot pins 38.

In Fig. 5 is illustrated in detail the construction of the shafts 7, 8 and 12, and in such figure the shaft 8, instead of having straight slots 15, as in the former instance, has been shown as provided with slots, as 39, which are inclined and extend oppositely to the slots 14 of the shaft 7. This arrangement provides for a greater degree of angular movement of the rounds 9 and may be advantageously used in certain connections.

It will be understood that in the constructions ordinarily used wherein rigid or substantially rigid rounds are employed, when such rounds are turned angularly, their central portions are brought nearer the center of the reel than their end portions, the distance of which from the center is always the same. In the present invention, however, the central portions of the rounds, by virtue of the break joint 30 between the sections 28 and 29, is at the same distance from the center as the end portions thereof and the links 32 afford positive means for maintaining this relation. Consequently the relation of the axis of the rounds to the cutter bar is parallel and may be graphically represented by a straight or substantially straight line equidistant at all points from the cutter bar.

The construction of the rounds in telescoping sections and the provision of the coupling members 33, provide for accurate angular adjustments of the rounds without axial movement of the shafts 7 or 8 or of the spider frames which are connected thereto and the result is that the reel as an entirety is stronger and simpler and more efficient in carrying out its function. The collar 16, as previously stated, holds the shaft 8 against axial movement with respect to the shaft 7 and the latter is in turn held against axial movement preferably by a sleeve, as 40, which surrounds the shaft 7 between the bearings 10 and which is held fast on said shaft by a set screw, as 41.

Having fully described our invention, we claim:

1. In a reel for harvesters, in combination, end frames having spokes, beater rounds connecting corresponding spokes and pivoted thereto, each beater round comprising pivotally connected sections and means for effecting a relative partial rotation of the end frames to vary the angular disposition of the beater rounds.

2. In a reel for harvesters, in combination, end frames having spokes, beater rounds connecting corresponding spokes and each comprising end sections and an intermediate section, the end sections being pivoted to the adjacent spokes and the intermediate section being pivotally related to one of the end sections and slidably related to the other end section, and means for effecting a relative partial rotation of the end frames to vary the angular disposition of the beater rounds.

3. In a reel for harvesters, in combination, end frames having spokes, a member fitted over the end of each spoke and having partial rotation, beater rounds connecting corresponding spokes and each comprising end sections and an intermediate section, the end sections being pivoted to the adjacent members and the intermediate section being pivotally related to one of the end sections and slidably related to the other end section, and means for effecting a relative partial rotation of the end frames to vary the angular disposition of the beater rounds.

4. In a reel for harvesters, in combination, end frames having spokes, beater rounds connecting corresponding spokes and pivotally related thereto, a shaft carrying one end frame, a second shaft carrying the other end frame, means connecting the shafts for rotation together and means for effecting a partial relative rotation of the shafts without any relative axial movement thereof.

5. In a reel for harvesters, in combination, end frames having spokes, beater rounds connecting corresponding spokes and pivotally related thereto, a hollow shaft carrying one of the end frames, a second hollow shaft surrounding the first shaft and carrying the other end frame, said shafts having relatively inclined slots, a shaft disposed within the first shaft and slidable relatively thereto and to the second shaft, said slidable shaft having a pin projecting through the slots, and means for operating the slidable shaft.

6. In a reel for harvesters, in combination, end frames, beater rounds connected thereto for angular adjustment and having yieldable intermediate portions, means associated with the yieldable portions for maintaining them at the same distance from the center of the reel in any angular positions of the beater rounds and means for angularly adjusting the beater rounds.

In testimony whereof we have hereunto set our hands in presence of two subscribing witnesses.

JOHN HERBERT HUDDLE.
CALHOUN DALLAS HUDDLE.

Witnesses:
W. H. GALWAY,
J. H. EPPERLY.